United States Patent [19]

Schuler

[11] 4,361,038
[45] Nov. 30, 1982

[54] LIQUID LEVEL SENSOR
[75] Inventor: Alan L. Schuler, Hingham, Mass.
[73] Assignee: General Dynamics Corporation, St. Louis, Mo.
[21] Appl. No.: 211,628
[22] Filed: Dec. 1, 1980
[51] Int. Cl.³ .............................................. G01F 23/22
[52] U.S. Cl. ..................................... 73/295; 73/304 C; 137/392; 340/620; 340/622; 361/284
[58] Field of Search ..................... 73/304 C, 302, 298, 73/295, 294; 137/582, 392; 340/620, 622

[56] References Cited
U.S. PATENT DOCUMENTS

| | | | |
|---|---|---|---|
| 3,312,936 | 4/1967 | Huntzinger | 340/59 |
| 3,335,243 | 8/1967 | Canaday | 340/622 X |
| 3,391,547 | 7/1968 | Kingston | 62/218 |
| 3,461,446 | 8/1969 | Sergeant | 340/244 |
| 3,496,773 | 2/1970 | Cornish | 73/295 |
| 3,630,083 | 12/1971 | Gorans | 73/294 |
| 3,742,245 | 6/1973 | Hallen et al. | 73/295 X |
| 4,002,996 | 1/1977 | Klebanoff et al. | 73/304 C |
| 4,065,760 | 12/1977 | Feldon | 340/622 |
| 4,081,998 | 4/1978 | Martig, Jr. | 73/302 |
| 4,099,167 | 7/1978 | Pomerantz et al. | 73/304 C X |

Primary Examiner—Daniel M. Yasich
Attorney, Agent, or Firm—Fitch, Even, Tabin, Flannery & Welsh

[57] ABSTRACT

In a liquid level sensing apparatus having a stillwell in a liquid-holding tank disposed around the sensing device, a bubble shield is provided to interdict the upward flow of bubbles to the stillwell to protect the sensor from contact with bubbles or foreign matter which could result in a false reading.

12 Claims, 4 Drawing Figures

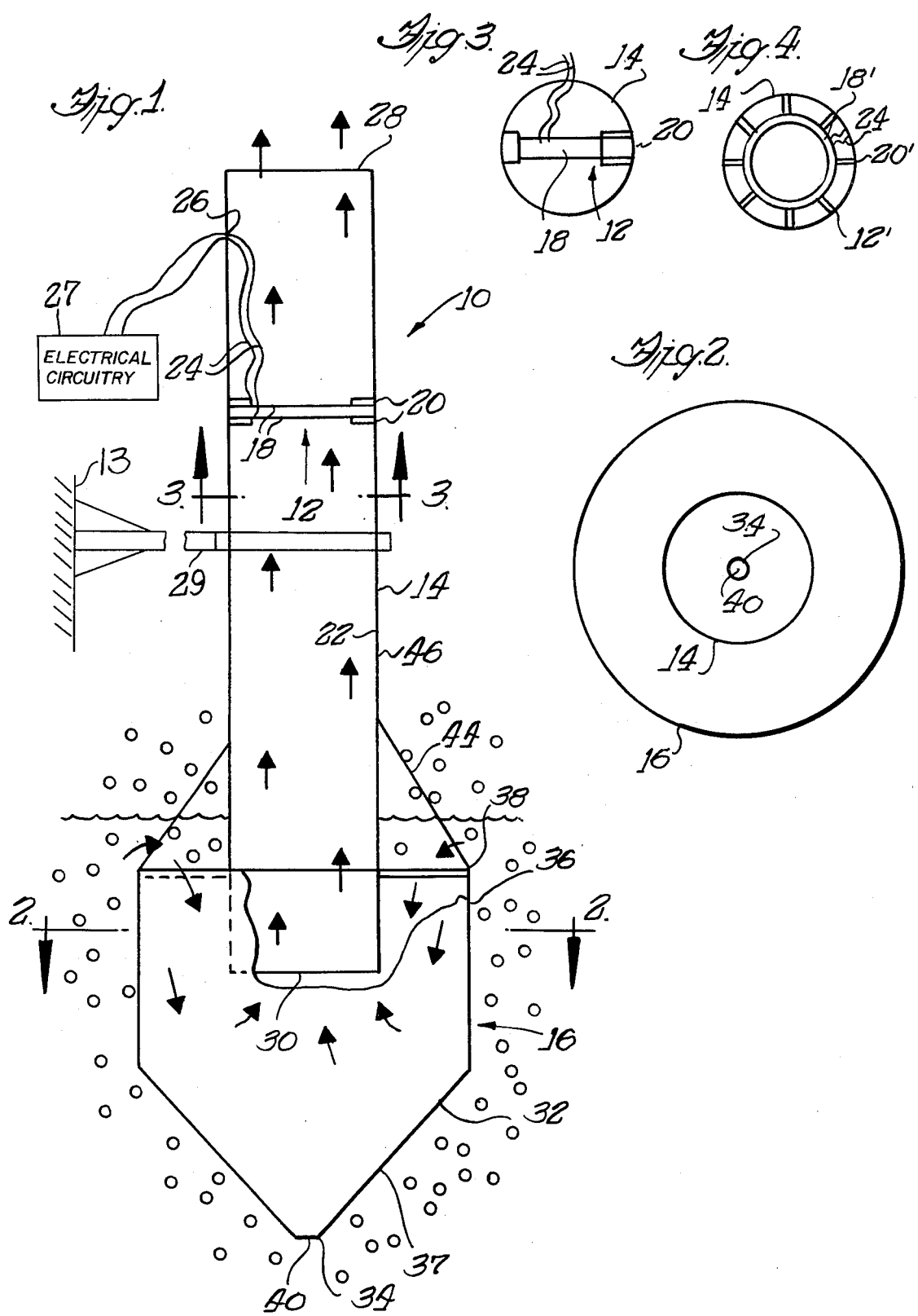

LIQUID LEVEL SENSOR

The present invention relates to liquid level sensing apparatus and more particularly to apparatus employing a shield to protect a capacitor type liquid level sensor from contact with upwardly flowing bubbles.

BACKGROUND OF THE INVENTION

For many purposes it is desirable to know when liquid reaches or falls below a certain predetermined level. When filling a tank, such as a tank for transporting liquified natural gas (LNG) at a cryogenic temperature, knowing precisely when the tank is filled to a certain level will prevent overfilling. In a cryogenic cooling system for superconductors, the level of fluid may be highly critical as the evaporation of the cryogenic coolant may result in normalization of superconducting circuits and consequential burning out of intricate and expensive apparatus.

Among the types of liquid level sensors available are capacitor sensors which respond to the difference between the dielectric constants of the liquid and the atmosphere and which, through appropriate circuitry, are linked to indicia which alert an operator of liquid level change and/or to relays to activate or deactivate associated apparatus as the liquid level changes. For example, an audible or visual alarm may be linked to the capacitor sensor so that workers filling an LNG tank will know that the tank is filled and cease filling the tank. In a superconducting system, the liquid level sensor may be linked to a switch which cuts power to superconducting circuitry should the cryogenic coolant fall below a certain level so that normalization of circuitry does not result in electrical damage.

Accuracy of liquid level sensing requires that the apparent liquid level at a sensor, such as a capacitor sensor, reflect the true liquid level in the tank. For accurate liquid level detection, it is desirable to eliminate various factors which could provide a capacitor sensor with a false apparent level.

In a ship's LNG tank which is being filled, the surface of the liquid is disturbed by the inflow of the liquid and conceivably by waves in the harbor. The resulting liquid surface movement in the tank might alternately expose the capacitor sensor to atmosphere when the true average liquid level is above the sensor and submerge the sensor when the true average liquid level is below the sensor. The term "atmosphere" herein is used broadly to include ambient atmosphere or an atmosphere which consists primarily of vapors of the liquid as will often be the case in a cryogenic tank. Air and most gases have dielectric constants of about 1. If other sensors, such as thermal sensors, are used to detect the liquid level, they are selected to respond to differences in physical properties of the "atmosphere" and the liquid, but not between various "atmospheres". To isolate liquid level sensors from such apparent fluid level changes, prior art devices have employed stillwells which, in their simplest form, may take the form of a tube open at both ends with the top end in communication with the atmosphere and the bottom end in communication with the liquid. The liquid level sensor, which is located in the stillwell, is substantially laterally isolated from the effects of wave motion or sloshing in the tank. Furthermore, it is necessary to prevent foreign matter that may enter the tank along with the cryogenic liquid from interferring with the liquid level sensor.

A potential cause of false readings by a liquid level capacitor sensor is bubbles which may accumulate between the plates thereof. Bubbles are particularly problematic with low boiling point liquids, especially cryogenic liquids, which are at equilibrium so that the inflow of heat from the environment results in the creation of vapor bubbles. Bubbles also result from the mechanical disturbances and the effects of pumping and fluid flow when a tank is being filled. Thus, the problem of bubbles is particularly acute at a time when it is most important to know the level in the tank. Bubbles trapped between capacitor plates and below the surface may lower the dielectric constant between the plates to give the capacitor sensor a misleadingly low capacitance. Alternatively, bubbles bridging the gap between capacitor plates may give the capacitor sensor a misleadingly high capacitance well after the liquid level has receded below the level of the capacitor sensor.

It would be desirable to provide liquid level sensing apparatus in which false readings resulting from bubble-sensor contact are substantially eliminated.

Accordingly, it is a primary object of this invention to provide liquid level sensing apparatus in which the sensor is shielded from bubbles.

SUMMARY OF THE INVENTION

In liquid level sensing apparatus, a liquid level sensor is located within a stillwell to laterally isolate the liquid around the sensor from surface disturbances which may lead to false apparent liquid level readings. A bubble shield is disposed below the stillwell to interdict the upward path of bubbles to the bottom end of the stillwell and to deflect the bubbles away from the stillwell.

BRIEF DESCRIPTION OF THE DRAWINGS

FIG. 1 is a elevation view of liquid level sensing apparatus including a bubble shield and embodying various features of the invention;

FIG. 2 is a cross-sectional view of the stillwell and bubble shield taken along line 2—2 of FIG. 1;

FIG. 3 is a cross-sectional view of the stillwell taken along line 3—3 of FIG. 1.

FIG. 4 is a cross-sectional view similar to FIG. 3, of an alternative embodiment in which the capacitor sensor has coaxial tubular plates.

DETAILED DESCRIPTION OF THE DRAWINGS

Illustrated in FIG. 1 is a preferred embodiment of a liquid level sensing device 10 in which a sensing device in the form of capacitor sensor 12 is located in a stillwell 14 which laterally isolates the liquid therein from surface disturbances and thereby prevents the capacitor sensor from responding to false apparent changes in the liquid level. A bubble shield 16 protects the stillwell 14 from rising bubbles.

The capacitor sensor 12 is positioned a predetermined distance from the bottom of a liquid-holding tank 13 to detect when the liquid level rises above or falls below a certain level. The capacitor sensor 12 is linked to electrical apparatus 27 which performs functions according to the liquid level in the liquid-holding tank 13. For example, the sensor 12 may be linked to control apparatus which actuates a valve to turn off liquid inflow to the tank after the liquid has risen above a predetermined level.

The capacitor sensor 12 shown in FIGS. 1 and 3 consists of two parallel plates 18 spaced a predetermined vertical distance from each other that are individually supported by insulating supports 20 which extend from the interior surface 22 of the stillwell 14. Preferably the supports 20 are attached to the non-facing sides of the plates 18 so as not to affect the capacitance of the capacitor sensor. Leads 24 are passed through an orifice 26 in the wall of the stillwell 14 to connect the capacitor 12 to associated electrical circuitry 27. The plates 18 may alternatively be spaced horizontally from each other. The precise arrangement of the plates is not particularly critical in comparison to the total depth of the tank.

Illustrated in FIG. 4 is an alternative embodiment of a capacitor sensor 12' having a pair of tubular capacitor plates 18' that are held in spaced coaxial alignment by a plurality of insulating supports 20' extending inward from the interior surface 22 of the stillwell 14. Coaxial tubular capacitor plates 18' within a tubular stillwell 14, efficiently utilize the available space so that the plates have large charge-collecting surfaces. Coaxial tubular plate 18' also allows relatively unobstructed liquid flow through the stillwell 14.

A plurality of capacitor sensors 12 may be provided at varying levels within the stillwell if it is desired to know the progression of filling or depletion of liquid in the tank. For example, a stillwell may surround an upper capacitor sensor at the full level of the tank 13 and a second capacitor sensor spaced therebelow, the lower sensor being linked to an appropriate alarm to give a preliminary indication that the level in the tank is approaching its full level.

The stillwell 14 in the illustrated embodiment is a cylindrical tube open at its bottom end 30 to admit liquid and at its top end 28 to vent atmosphere. The stillwell 14 can be mounted from an interior vertical wall of the liquid-holding tank 13, for example, by a simple horizontally-extending bracket 29 having one end attached to the sidewall of the tank and its other end securely clamped to the stillwell. The stillwell 14 laterally isolates the liquid therein so that the liquid level in the stillwell reflects the true liquid level in the tank, since the liquid level in the narrow stillwell does not respond quickly to surface disturbances in the greater tank.

In a tank which is being filled with a cryogenic liquid that is usually at its boiling point, a steady flow of bubbles or other foreign matter is rising throughout the tank. Even after the tank is filled, some bubbles continue to form primarily at the walls and the bottom of the tank where there is an inflow of heat from the higher temperature environment. The shield 16 interdicts the upwardly flowing bubbles and deflects them away from the bottom end 30 of the stillwell 14. In the illustrated embodiment in which the stillwell 14 is a cylindrical tube, the shield 16 has a lower conical portion 32 and an upper cylindrical or sleeve portion 36, the upper rim 38 of which extends above the bottom end 30 of the stillwell 14.

The conical shape of the exterior surface 37 of the lower portion 32 rises continuously upward from a vertex 34 to deflect any upwardly moving bubbles from the central region enclosed by the shield 16, thereby preventing them from reaching the capacitor sensor. This angled design prevents bubbles from being trapped below the shield 16 along the downward facing surface 37. To prevent trapping of bubbles below the shield 16 and to provide adequate deflection of bubbles, the lower surface 37 of the shield preferably slopes upward from the vertex at an angle of between about 30° and about 70° to the vertical. Other shapes, which rise continuously from a lower vertex may also be used for the lower portion of the shield. For example, a lower portion in the shape of a pyramid may be conveniently used for connection to a stillwell of rectangular cross section.

The upper edge or rim 38 of the sleeve 36 is located a sufficient distance above the bottom end 30 of the stillwell 14 to prevent bubbles from laterally entering the stillwell even if some sloshing or minor wave movement occurs at the upper liquid surface. For rapidly boiling cryogenic liquids, the rim 38 should extend above the bottom end 30 of the stillwell at least above one-fourth the length of the inside diameter of the stillwell. So that the liquid level at the capacitor sensor 12 accurately reflects the liquid level of the greater tank at all times, the rim 38 is disposed below the capacitor sensor and is preferably at least about two times the inside stillwell diameter below the capacitor sensor.

When a tank, such as an LNG tank, is being filled, liquid rises above the level of the rim 38 of the shield 16 and then flows over it and downward around the bottom end of the stillwell 14. If the liquid current into the stillwell 14 carries bubbles downward into the stillwell, the initial effect of the shield 16 is partially negated. Later, bubbles will not be carried into the stillwell 14 as the flow rate of the liquid over the rim 38 and into the stillwell is less than the flow rate at which bubbles rise through the liquid. The rate of liquid flow downward into the stillwell 14 may be sufficiently limited relative to the upward bubble flow rate if the upper rim 38 is spaced a sufficient horizontal distance from the outside of the stillwell. If this distance is sufficiently large relative to the inside diameter of the stillwell, the horizontal flow time between the shield 16 and the stillwell 14 will allow the bubbles, which are carried over the shield rim 38, to rise through the liquid before they are carried into the stillwell. For LNG, the flow rate of liquid into the stillwell 14 will be sufficiently slow relative to the rate of bubble rise if the horizontal distance between the exterior of the stillwell and the exterior of the shield 16 is at least about 1.2 times the inside diameter of the stillwell.

A small drain opening 40 is provided generally at the vertex 34 of the shield 16 to allow liquid to drain from the shield 16 when the tank is being emptied. While some tiny bubbles may conceivably pass through the drain opening 40 or be carried through by the upward leakage of liquid, they will not be of a sufficient magnitude to interfere with the capacitor sensor 12. Preferably the drain opening 40 has sufficient area to allow substantially all of the liquid to drain from the shield 16 in about two minutes from the time the liquid level in the tank falls below the shield vertex, and usually, the opening is about 3 mm. in diameter in LNG tanks.

For cryogenic liquids with boiling points below that of oxygen, such as liquid nitrogen, it may be of concern that oxygen and vapors of combustible material from the surrounding atmosphere do not condense and accumulate in sufficient concentrations to cause combustion. The drain opening 40 serves to prevent accumulation of such condensed liquids in the restricted vertex 34 of the shield 16 by permitting condensed material to drain into the greater tank where it is dissipated.

The shield 16 is suspended from the stillwell 14 with a plurality of supports 44 extending from the exterior surface 46 of the stillwell. For a cylindrical stillwell 14, at least three generally evenly spaced supports 44 are used. To best support the shield 16, the supports 44 slope upward from the shield to the stillwell 14 at an angle of between about 30° and about 45° to the vertical. For further support, short generally horizontal struts 48 may further join the stillwell 14 to the shield 16 in a rigid triangular configuration with the supports 44 and the exterior surface 46 of the stillwell. While the supports 44 should be sufficiently strong to support the shield 16, the supports are preferably narrow so as not to interfere with liquid flow to the stillwell 14 and preferably cover no more than about 10% of the annular area between the shield and the stillwell.

While the liquid level sensing apparatus 10 has been described in terms of an embodiment which employs a capacitor sensor, apparatus including the bubble shield 16, may employ a different type of sensor, e.g., a thermal sensor, which (although diagrammatically resembling the sensor shown in FIG. 1) functions by detecting a change in a different physical property, i.e., temperature, between liquid and vapor.

For certain purposes, it may be unnecessary to provide a drain opening at the bottom of the bubble shield. The volume of the bubble shield is negligable as compared to the volume of the tank. After a tank is drained, a small volume of cryogenic liquid trapped in a bubble shield quickly evaporates. By eliminating the drain opening, the sensor is protected from small bubbles or pieces of foreign matter which might pass through the opening. If the drain opening is eliminated, the shape of the lower surface of the shield is less important, and it does not matter that a few bubbles might gather on the lower surface so long as the upwardly rising bubbles and foreign matter are deflected away from the lower end of the stillwell. Such a bubble shield may take the form of a circular or rectangular cylinder.

While the invention has been described in terms of certain preferred embodiments, modifications obvious to one skilled in the art may be made without departing from the scope of the present invention.

Various features of the invention are set forth in the following claims.

What is claimed is:

1. Apparatus for detecting a liquid level within a liquid-holding tank having liquid level sensing means located at a predetermined depth in the tank, which sensing means disposed in a tube means mounted to the liquid tank is responsive to the difference in a physical property of the liquid in the tank and the vapor above the liquid surface, said tube means comprising a stillwell means laterally surrounding said sensing means having an upper opening through which said stillwell means is in communication with the atmosphere and a lower opening through which said stillwell means is in communication with the liquid, said stillwell means isolating the liquid therewithin from surface disturbances of the liquid in said tank that would expose said sensing means to a false apparent liquid level, and shield means attached to the bottom portion of said stillwell means in the path of bubbles flowing upwardly toward said lower opening for interdicting the upwardly-flowing bubbles and deflecting the bubbles away from said lower opening.

2. An apparatus according to claim 1 wherein said stillwell means is an open ended tube.

3. Apparatus according to claim 1 wherein said liquid level sensing means is a capacitor sensor.

4. Apparatus according to claim 1 wherein said liquid level sensing means is a thermal sensor.

5. Apparatus for detecting a liquid level within a tank having;

liquid level sensing means located at a predetermined depth in the tank, which sensing means disposed in a tube means mounted to the liquid tank is responsive to the difference in a physical property of the liquid in the tank and the vapor above the liquid surface, said tube means comprising a stillwell means laterally surrounding said sensing means having an upper opening through which said stillwell means is in communication with the atmosphere and a lower opening through which liquid flows, said stillwell means isolating the liquid therewithin from surface disturbances of the liquid in said tank that would expose said sensing means to a false apparent liquid level, and shield means attached to the bottom portion of said stillwell means in the path of bubbles flowing upwardly toward said lower opening for interdicting the upwardly-flowing bubbles and deflecting the same from said lower opening, said shield means having an upper rim laterally surrounding said stillwell means and located above said lower opening of said stillwell means and lower than said sensing means whereby liquid is caused to flow over said rim prior to flowing into said stillwell means.

6. Apparatus according to claim 5 wherein said upper rim of said shield means is disposed above said bottom end of said stillwell means at least about one-fourth the length of the inside diameter of said stillwell means.

7. Apparatus according to claim 5 wherein the horizontal distance between the exterior of said stillwell means and the exterior of said shield means is at least about 1.2 times the inside diameter of said stillwell means.

8. Apparatus for detecting a liquid level within a fluid-holding tank having;

liquid level sensing means located at a predetermined depth in the tank, which sensing means disposed in a tube means mounted to the liquid tank is responsive to the difference in a physical property of the liquid in the tank and the vapor above the liquid surface, said tube means comprising a stillwell means laterally surrounding said sensing means having an upper opening through which said stillwell means is in communication with the liquid, said stillwell means isolating the liquid therewithin from surface disturbances of the liquid in said tank that would expose said sensing means to a false apparent liquid level, and shield means attached to the bottom portion of said stillwell means in the path of bubbles flowing upwardly toward said lower opening for interdicting the upwardly-flowing bubbles, said shield means having a lower surface which rises continuously from a lower vertex, which lower surface deflects the upwardly-flowing bubbles away from said lower opening.

9. An apparatus according to claim 8 wherein a drain opening is provided generally at said vertex of said shield means; said drain opening being sufficiently small to prevent bubbles from passing therethrough of a size which would interfere with said sensing means.

10. Apparatus according to claim 9 wherein the diameter of said drain opening is about 3 mm.

11. An apparatus according to claim 8 wherein the shape of said lower surface of said shield means is generally conical.

12. Apparatus according to claim 8 wherein said shield means has a lower surface which rises continuously from a lower vertex at an angle of from about 30° to about 70° to the vertical.

* * * * *